United States Patent [19]
Ishibashi et al.

[11] Patent Number: 6,101,041
[45] Date of Patent: Aug. 8, 2000

[54] CROSS DICHROIC PRISM, METHOD OF MAKING THE SAME, AND FULL-COLOR PROJECTOR USING THE SAME

[75] Inventors: Kazufumi Ishibashi; Tetsuo Hattori; Kiyoshi Numazaki; Yasuhiro Iwaguchi; Shuichi Sugai; Tadaaki Nakamura; Masaaki Kusano, all of Kanagawa, Japan

[73] Assignee: Nikon Corporation, Tokyo, Japan

[21] Appl. No.: 09/145,468

[22] Filed: Sep. 2, 1998

[30]   Foreign Application Priority Data

| May 13, 1997 | [JP] | Japan | 9-122665 |
| May 13, 1997 | [JP] | Japan | 9-122666 |
| Sep. 2, 1997 | [JP] | Japan | 9-251474 |

[51] Int. Cl.[7] .................................................. G02B 27/14
[52] U.S. Cl. .............................. 359/634; 353/81; 353/20; 359/831
[58] Field of Search .................................. 359/634, 831; 353/33, 81, 20

[56]   References Cited

U.S. PATENT DOCUMENTS 5,909,944   6/1999   Yajima et al. ............................. 353/81
5,918,961   7/1999   Ueda ......................................... 353/20

FOREIGN PATENT DOCUMENTS

| 1-156701 | 6/1989 | Japan . |
| 7-294845 | 11/1995 | Japan . |
| 6-331807 | 12/1995 | Japan . |
| 8-184798 | 7/1996 | Japan . |
| 9-15405 | 7/1997 | Japan . |

*Primary Examiner*—Georgia Epps
*Assistant Examiner*—Tim Thompson
*Attorney, Agent, or Firm*—Foley & Lardner

[57]   ABSTRACT

A cross dichroic prism comprises four triangular prisms having isosceles right triangular cross sections identical in shape, opposing side faces thereof being bonded and secured together with rectangular portions thereof facing each other; and a dichroic film having an X-shaped cross section formed between the bonding faces of the triangular prisms; wherein, of the four triangular prisms, a given prism and at least one of the prisms adjacent thereto have a refractive index difference therebetween of 0.00005 or less, and the remaining two prisms opposed thereto have a refractive index difference therebetween of 0.00005 or less.

4 Claims, 16 Drawing Sheets

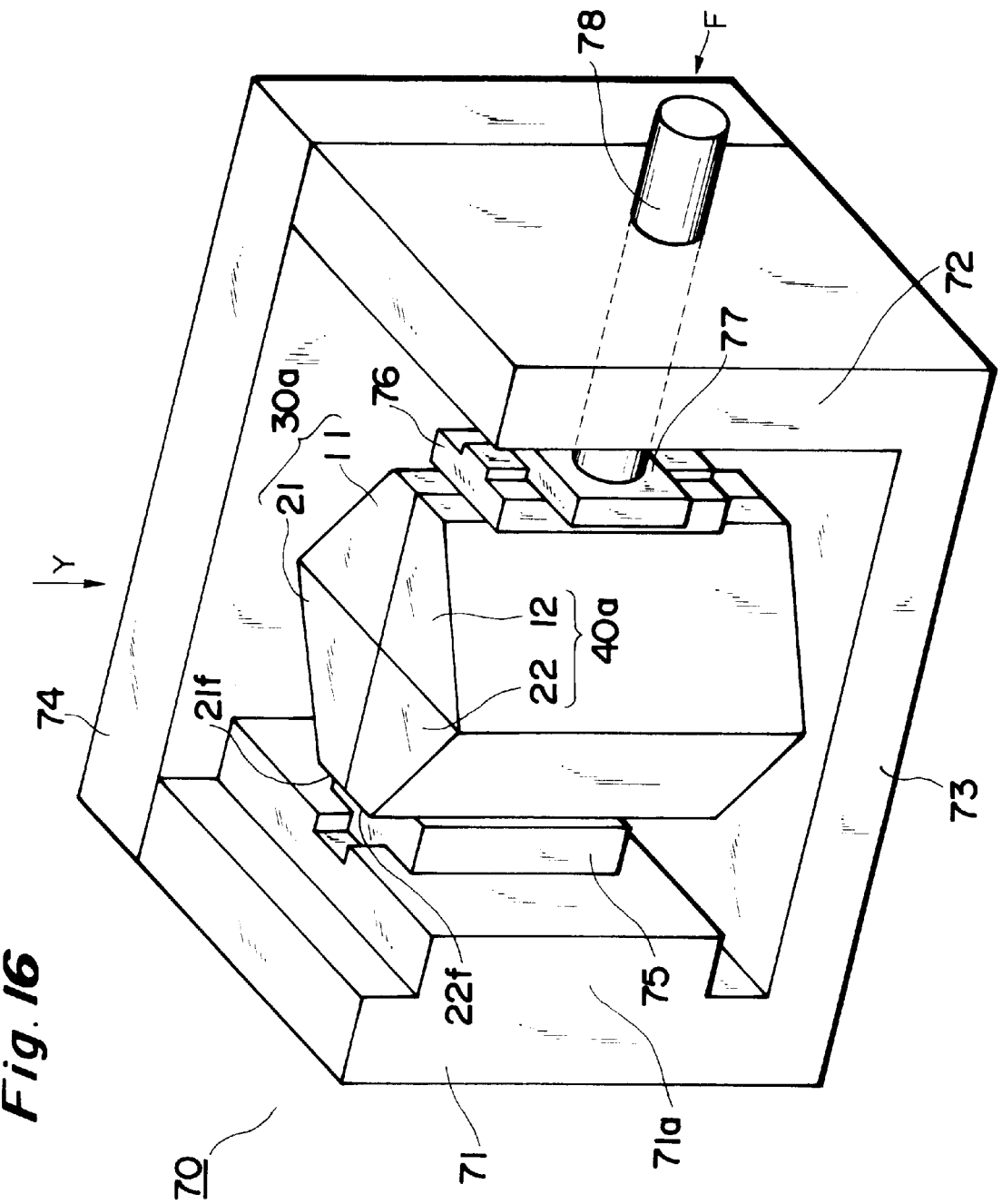

CROSS DICHROIC PRISM, METHOD OF MAKING THE SAME, AND FULL-COLOR PROJECTOR USING THE SAME

BACKGROUND OF THE INVENTION

1. Field of the Invention

The present invention relates to a cross dichroic prism used for decomposing source light into three primary colors and combining modulated individual color light components which are outputted from light valves in a full-color projector, a method of making the same, and a full-color projector using the same.

2. Related Background Art

Widely used in color-combining and decomposing systems in so-called three-sheet type full-color projectors is a quadrangular dichroic prism in which four isosceles right triangular prisms are assembled together at their rectangular portions, while a dichroic film is formed on thus pasted faces so as to yield an X-shaped cross section.

When this dichroic prism is used in a color-combining system, monochromatic light images of red (R), blue (B), and green (G) are respectively made incident on three faces among four side faces of the quadrangular prism and reflected by or transmitted through the dichroic film disposed at a center thereof, so as to be emitted out of the remaining one side face, thereby forming a combined light image. Here, when adjacent triangular prisms among the four triangular prisms constituting the dichroic prism have refractive indexes totally different from each other, refraction may occur between the adjacent prisms. As a result, emitted light images may not align with each other, thereby generating color shift.

For preventing the color shift, it is necessary to reduce the refractive index difference among the triangular prisms. One of such techniques is disclosed in Japanese Patent Application Laid-Open No. 6-331807.

In this technique, the refractive index difference between at least two sets of triangular prisms adjacent to each other is suppressed to 0.0005 or less. It discloses that, for this purpose, using prisms made in the same lot is important. It also discloses that, as a result, the optical axis deviation among the individual colors, i.e., image deviation, in a quadrangular dichroic prism whose sides each have a length of 40 mm can be suppressed to 13 $\mu$m, which is about $\frac{1}{3}$ of the pixel size of normally employed light valves, i.e., 40 $\mu$m.

SUMMARY OF THE INVENTION

As projected pictures have become finer, light valves employed in projectors have been reducing their individual pixel sizes. On the other hand, in order to respond to wider pictures, dichroic prisms themselves have been increasing their sizes. As a result, the refractive index difference that has been permissible in the dichroic prisms used for projectors for projecting conventional TV images may yield a critical optical axis deviation in such dichroic prisms that are used for projectors for projecting highly fine wide pictures.

For further reducing the optical axis deviation, it is necessary to further suppress the refractive index difference between the adjacent triangular prisms. The inventors have found, however, it difficult to suppress the refractive index difference of prisms to a level much smaller than 0.0005 even when they are manufactured in the same lot under the same processing condition from the same glass material. Even if there exists a combination of prisms in the same lot whose refractive index difference is small enough to satisfy the condition where the optical axis deviation is minimized, it takes time and labor to find out such a combination, which is unpractical.

The inventors, however, have found it possible to homogenize the refractive index distribution with a very high accuracy within the same member by controlling the conditions for making prism members, annealing, and the like. The present invention utilizes this finding; and relates to a dichroic prism which prevents image deviation and blurring from occurring due to the optical axis deviation, a method of making the same, and a projector utilizing the same.

Namely, the cross dichroic prism in accordance with the present invention comprises four triangular prisms having isosceles right triangular cross sections identical in shape, opposing side faces thereof being bonded and secured together with rectangular portions thereof facing each other; and a dichroic film having an X-shaped cross section formed between the bonding faces of the triangular prisms; wherein, of the four triangular prisms, a given prism and at least one of the prisms adjacent thereto have a refractive index difference therebetween of 0.00005 or less, and the remaining two prisms opposed thereto have a refractive index difference therebetween of 0.00005 or less.

Among the four triangular prisms, for example, a given prism and at least one of the prisms adjacent thereto are formed by processing a single prism member, whereas the remaining two triangular prisms opposed thereto are formed by processing the same or another single prism member.

It is sufficiently possible to keep a refractive index difference of 0.00005 or less within a single prism member, though its manufacturing condition has to be controlled strictly. The dichroic prism thus obtained by assembling two sets of triangular prisms each comprising two triangular prisms processed from the same prism member is suitable for a projector for projecting highly fine wide pictures.

On the other hand, the method of making a cross dichroic prism in accordance with the present invention comprises a first step of preparing two prism members each having an isosceles right triangular cross section with a cross-sectional area twice as much as that of each of four triangular prisms constituting the cross dichroic prism; a second step of forming a first dichroic film on the hypotenuse face of one of the prism members; a third step of forming a cemented member shaped like a regular quadrangular prism by bonding and securing the hypotenuse faces of the prism members together with an adhesive; a fourth step of cutting the cemented member at a plane which is orthogonal to the dichroic film and connects the opposing right angles of the two prism members, thereby forming two cemented members identically shaped like an isosceles right triangular prism; a fifth step of forming a second dichroic film on the hypotenuse face of one of the triangular-prism-shaped cemented members; and a sixth step of bonding and securing the hypotenuse faces of the triangular-prism-shaped cemented members together with an adhesive so as to form a prism having a cross dichroic film with an X-shaped cross section at a center thereof.

As a consequence, a dichroic prism in which the above-mentioned adjacent triangular prisms have a small refractive index difference therebetween can be obtained securely and easily.

The full-color projector in accordance with the present invention comprises the above-mentioned cross dichroic prism in accordance with the present invention. As a consequence, the optical axes of the respective light images of three primary colors can be aligned with each other with a high accuracy, whereby the projector is suitable for projecting highly fine wide pictures.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is a perspective view showing a configuration of a cross dichroic prism in accordance with the present invention, whereas

FIGS. 7 and 8 are views showing a step subsequent to that of FIGS. 6A and 6B, in which FIG. 7 is a perspective view showing how the first and second cemented members are bonded together by means of a jig, whereas FIG. 8 is a view thereof observed from the direction X of FIG. 7;

FIG. 10 is a perspective view showing a cross dichroic prism in accordance with a second embodiment of the present invention, whereas

FIGS. 16 and 17 are views showing a step subsequent to that of FIGS. 15A and 15B, in which FIG. 16 is a perspective view showing how the first and second cemented members are bonded together by means of a jig, whereas FIG. 17 is a view thereof observed from the direction Y of FIG. 16.

DETAILED DESCRIPTION OF THE PREFERRED EMBODIMENTS

Figure 1:
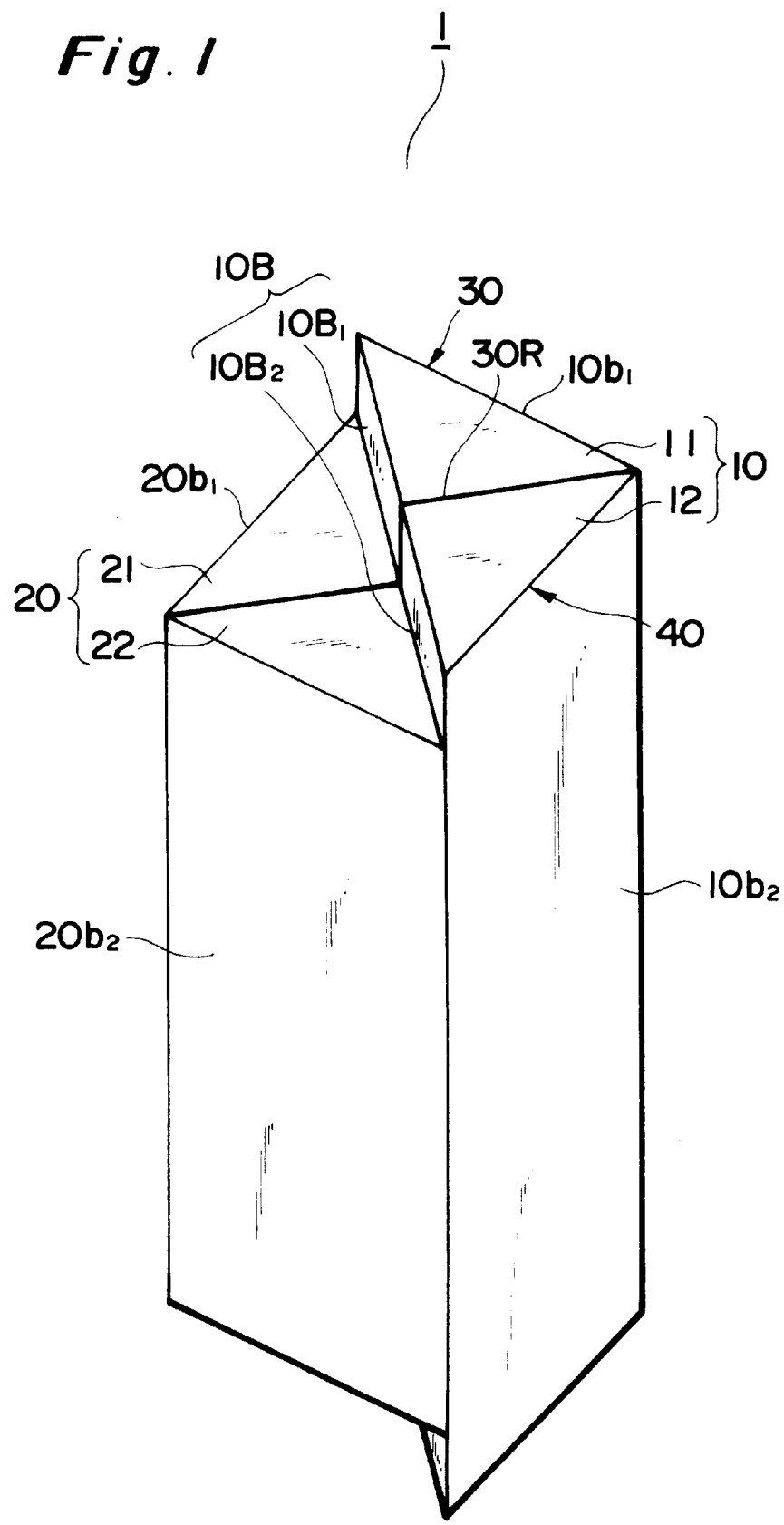

In the following, some of preferred embodiments of the present invention will be explained with reference to the accompanying drawings. To facilitate the comprehension of the explanation, the same reference numerals denote the same elements, where possible, throughout the drawings, and a repeated explanation will be omitted.

Figure 2:
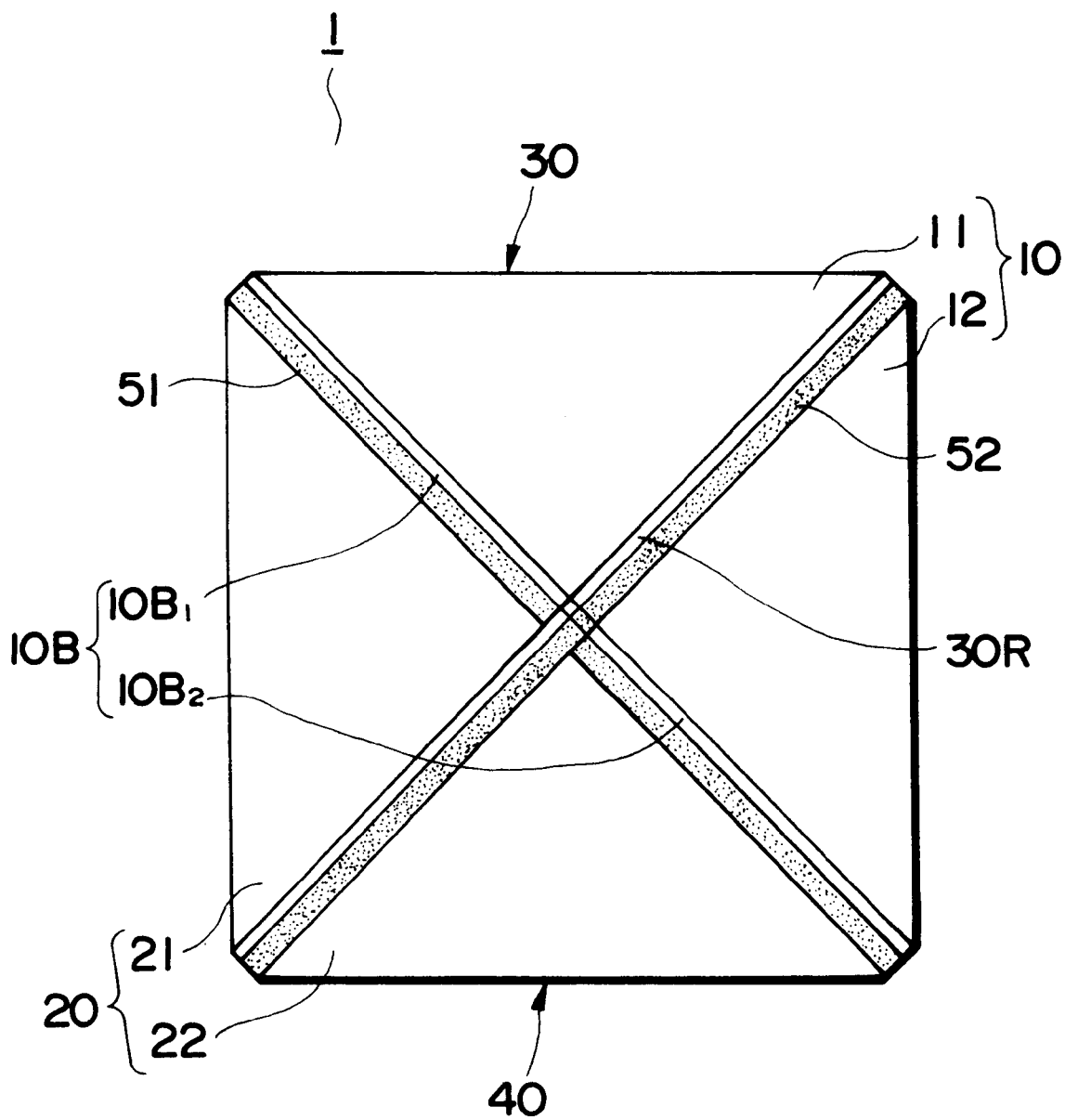
FIG. 2 is a horizontal sectional view thereof.

FIG. 1 is a perspective view showing a configuration of a first embodiment of the cross dichroic prism in accordance with the present invention, whereas FIG. 2 is a horizontal sectional view thereof. As shown in FIGS. 1 and 2, this cross dichroic prism 1 is constituted as substantially a quadrangular prism in which rectangular portions of four triangular prisms 11, 12, 21, 22, having isosceles right triangular cross sections identical in shape, are butted against each other. Dichroic films $10B_1$, $10B_2$ for reflecting blue light are disposed between the prisms 11 and 21 and the prisms 12 and 22, respectively. A dichroic film 30R for reflecting red light is disposed between the prisms 11 and 12 and the prisms 21 and 22. The height of the triangular prisms 11, 12 is greater than that of the triangular prisms 21, 22, whereby the prisms 11, 12 protrude from the upper and lower sides of the prisms 21, 22. The four prisms 11, 12, 21, 22 are firmly bonded together with adhesives 51, 52 as shown in FIG. 2.

Among the four prisms 11, 12, 21, 22, the refractive index difference between the prisms 11 and 12 and the refractive index difference between the prisms 21 and 22 are each adjusted so as not to exceed 0.00005, which is lower than that of the above-mentioned conventional product by one digit. The refractive index difference between the prism 11 or 12 and the prism 21 or 22 may be greater than this value.

When monochromatic light images of green, red, and blue are made incident on thus configured cross dichroic prism 1 from side faces $20b_2$, $20b_1$, $10b_2$, respectively, the green light image incident from the side face $20b_2$ is transmitted through the prism 1 as it is, the red light image incident from the side face $20b_1$ is reflected by the dichroic film 30R, and the blue light image incident from the side face $10b_1$ is reflected by the dichroic film 10B ($10B_1$ and $10B_2$), whereby the individual color light components are combined together, and the resulting composite light is emitted out of a side face $10b_1$. Namely, the cross dichroic prism 1 can be used as a combining optical system for three primary color light components. On the other hand, when white light is made incident thereon from the side face $10b_1$, due to the principle reverse to that mentioned above, the white light is decomposed into green, red, and blue color components, which are emitted out of the side faces $20b_2$, $20b_1$, $10b_2$, respectively. Namely, it can also be used as a decomposing optical system.

Figure 3:
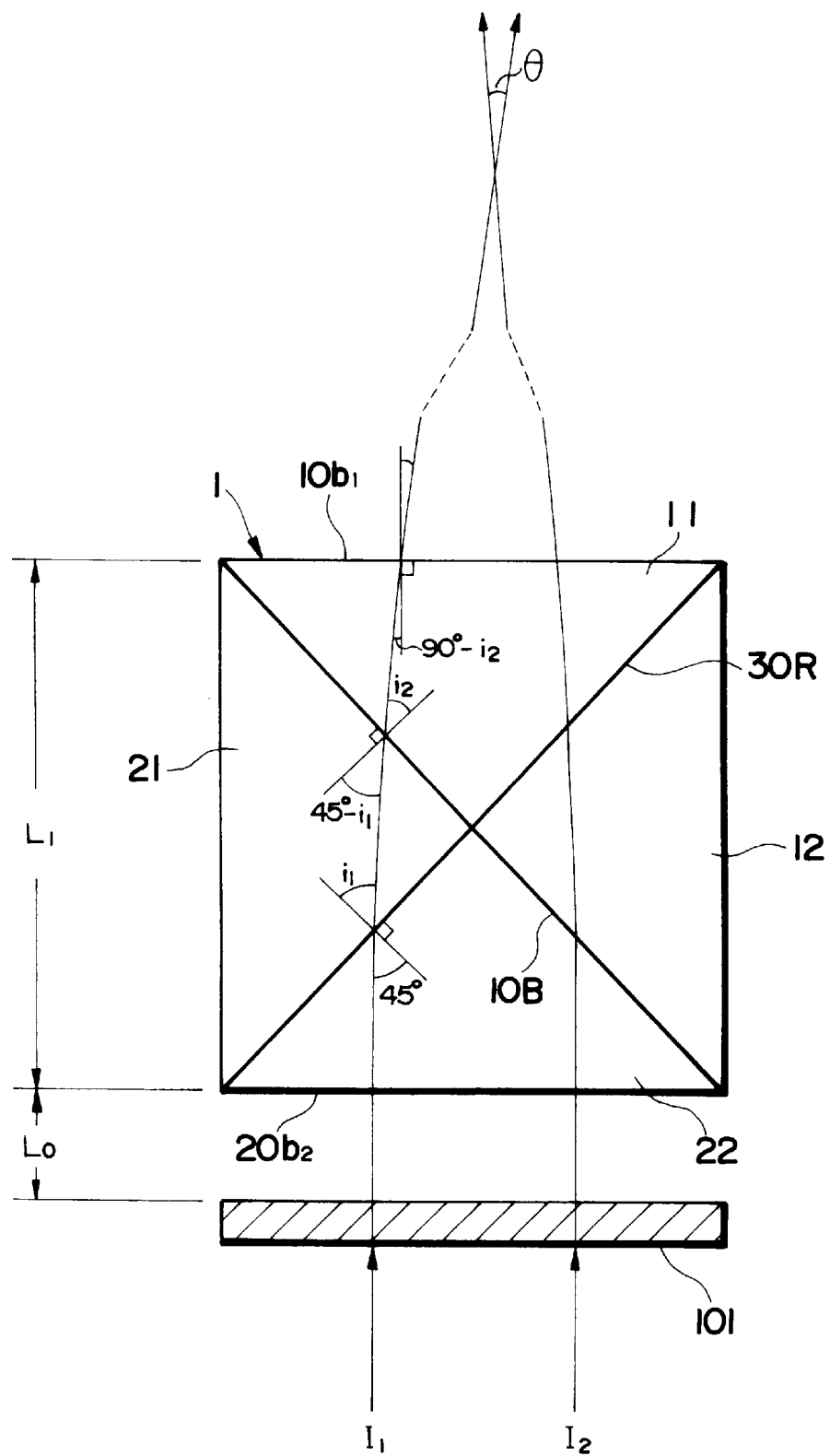
FIG. 3 is a schematic optical path view of this cross dichroic prism.

FIG. 3 is an optical schematic view of the cross dichroic prism 1 being employed in a projector. A transmission type liquid crystal light valve 101 for a green light image is disposed in front of the side face $20b_2$ of the prism 1. Parallel light beams $I_1$ and $I_2$ are made incident on the liquid crystal light valve 101. When the individual prisms 11, 12, 21, 22 constituting the prism 1 have refractive indexes different from each other, refraction occurs at the boundaries between the individual prisms, whereby the output light beams would not be in parallel to each other, with their optical axes forming an angle of θ therebetween. Here, assuming the refractive indexes of the individual prisms 11, 21, and 22 to be $n_1$, $n_3$, and $n_4$, respectively, the incident angles of the light beam $I_1$ onto the prisms 21 and 11 and the emission angle thereof from the prism 11 to be $i_1$, $i_2$, and $i_3$, respectively, the following expressions hold true:

$$n_4 \sin 45° = n_3 \sin i_1 \quad (1)$$

$$n_3 \sin(90° - i_1) = n_1 \sin i_2 \quad (2)$$

$$n_1 \sin(45° - i_2) = \sin i_3 \quad (3)$$

Similar relationships hold true for the light beam $I_2$ on the opposite side as well. As a consequence, the above-mentioned angle θ can be determined. Assuming the air-converged length of the optical path from the exit face of the light valve 101 to the exit face of the prism 1 to be L, the pixel deviation amount ΔL is represented by:

$$\Delta L = L \cdot \tan\theta \quad (4)$$

Here, $L = L_0 + L_1/n$, wherein n is the average refractive index of the prism 1. Assuming one side of the horizontal cross section of the prism 1, i.e., $L_1$, to be 40 mm, the average refractive index n to be 1.50, and the light valve 101 to be disposed close to the entrance face $20b_2$ of the prism 1, the air-converted length L becomes 26.7 mm.

In the following, the pixel deviation amount ΔL will be studied in each of the cases where, of the four triangular prisms constituting the prism 1, two triangular prisms adjacent to each other have a refractive index difference therebetween of (a) 0.0005, (b) 0.0001, (c) 0.00005, and (d) 0.00001. Table 1 shows refractive indexes $n_1$, $n_2$, $n_3$, and $n_4$ of the four prisms 11, 12, 21, and 22 in each of these cases.

TABLE 1

Refractive Index of Triangular Prism

|   | (a) | (b) | (c) | (d) |
|---|---|---|---|---|
| $n_1$ | 1.5005 | 1.5001 | 1.50005 | 1.50001 |
| $n_2$ |  | 1.5000 |  |  |
| $n_3$ |  |  | 1.5000 |  |
| $n_4$ | 1.5005 | 1.5001 | 1.50005 | 1.50001 |

The case of (a) corresponds to the maximum permissible value in the above-mentioned prior art. In this case, the emission angle at the exit face $10b_1$ of the prism 1 deviates by 0.057 degree, whereby the amount of optical axis deviation becomes 53 μm. Hence, even when the light valve 101 having a pixel pitch of 40 μm is used, a deviation by one pixel or more would occur.

In the case of (b), the emission angle at the exit face $10b_1$ of the prism 1 deviates by 0.011 degree, whereby the amount of optical axis deviation becomes 10.7 μm. Though it is a sufficient level when the pixel pitch of the light valve 101 is 40 μm, it would be about ½ pitch when the pixel pitch is reduced to one half in order to display highly fine images, thus failing to satisfy a preferable condition of ⅓ pitch or less.

In the case of (c), the emission angle deviates by 0.0057 degree, and the amount of optical axis deviation becomes 5.3 μm. Here, the condition of ⅓ pitch or less can be satisfied even when the pixel pitch of the light valve 101 is 20 μm.

In the case of (d), the emission angle deviates by 0.0011 degree, and the amount of optical axis deviation becomes 1.1 μm. Here, the condition of ⅓ pitch or less can be satisfied even when the pixel pitch of the light valve 101 is made smaller than 20 μm. Even in the case where one side $L_1$ of the cross section of the prism 1 is set to 150 mm under the same refractive index condition, the amount of deviation caused by the refractive index difference is only 4 μm, and thus can be suppressed to a deviation amount sufficiently smaller than the pixel pitch.

Consequently, it has been confirmed that, when the refractive index difference between the adjacent prisms is suppressed to 0.00005 or less as with the above-mentioned first embodiment of the present invention, the optical axis deviation can be restrained from occurring, thereby preventing the pixel deviation and blurring from occurring.

In the following, a method of making the cross dichroic prism 1 in accordance with this embodiment will be explained step by step in detail.

First Step

Figure 4:
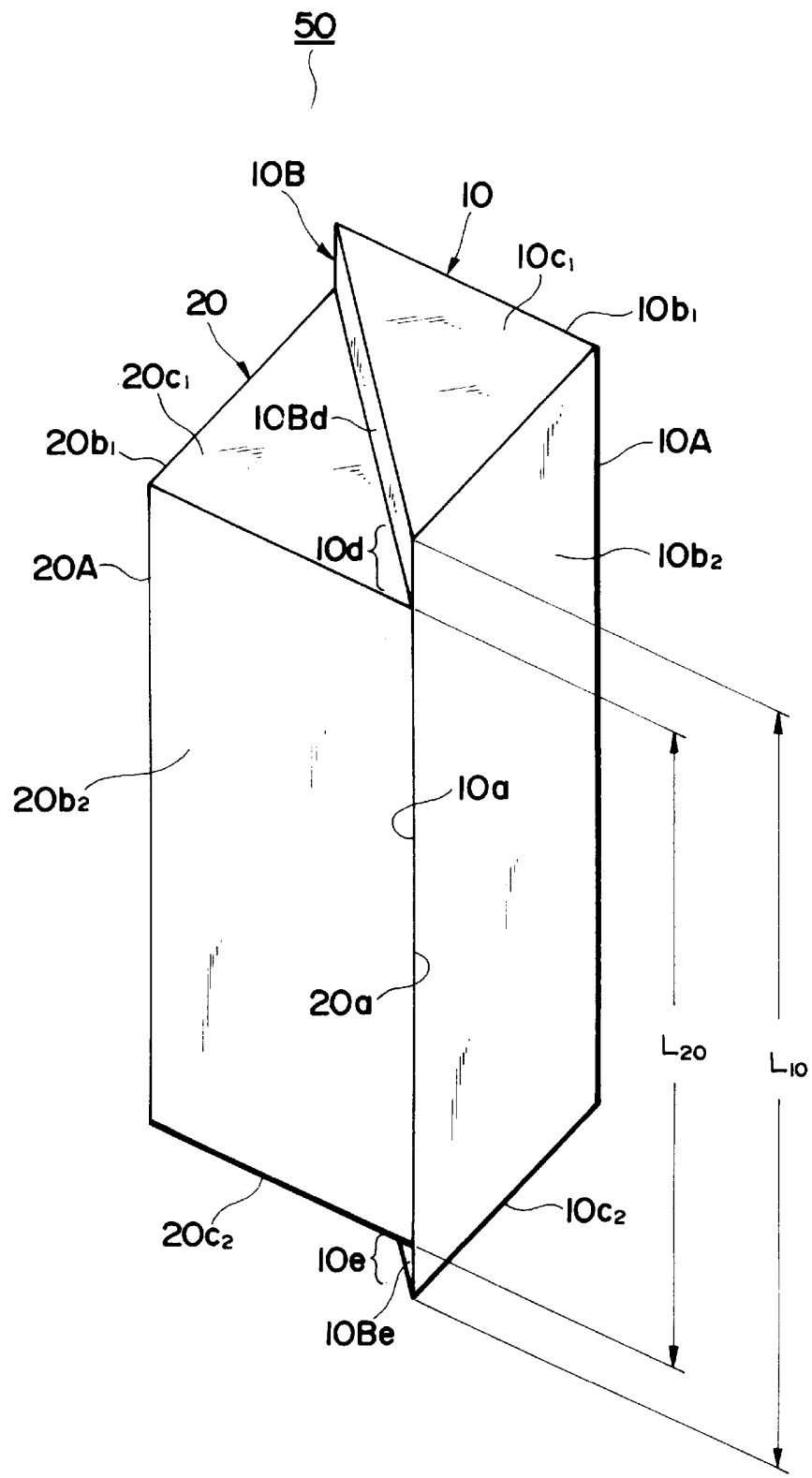
FIG. 4 is a view showing a part of manufacturing steps of a cross dichroic prism in accordance with a first embodiment, as a perspective view showing a cemented member in which two triangular prisms are bonded together.

As shown in FIG. 4, two transparent optical prism members having isosceles right triangular cross sections identical in shape, i.e., a first prism member 10 and a second prism member 20, are prepared. The first and second prism members 10, 20 are formed from optical glass. In this embodiment, they are set such that the first prism member 10 has a length $L_{10}$ greater than the length $L_{20}$ of the second prism member 20. In these prism members 10, 20, hypotenuse faces 10a, 20a opposing their rectangular portions 10A, 20A; side faces $10b_1$, $10b_2$, $20b_1$, $20b_2$ defining the rectangular portions 10A, 20A; and upper and lower bottom faces $10c_1$, $10c_2$, $20c_1$, $20c_2$ are accurately ground beforehand, thereby securing a predetermined shape and predetermined accuracy as a whole.

Here, the optical refractive index difference between the first prism member 10 and the second prism member 20 would not cause any problem in particular. Consequently, the first prism member 10 and the second prism member 20 may be produced either in the same lot or in different lots. Here, the expression "produced in the same lot" means that glass is melted in the same lot.

In the first and second prism members 10, 20, the hypotenuse faces 10a, 20a and the side faces $10b_1$, $10b_2$, $20b_1$, $20b_2$ are optically polished.

Second Step

On the optically polished hypotenuse face 10a of the first prism member 10, a first dichroic film (hereinafter referred to as "first light reflecting dichroic film") 10B having a characteristic of reflecting first light (which is assumed to be B light in this embodiment) is formed by a physical deposition technique such as vacuum deposition.

The hypotenuse face 20a of the second prism member 20 is left as it is, without being formed with the first light reflecting dichroic film 10B.

Third Step

The hypotenuse face 10a of the first prism member 10 formed with the first light reflecting dichroic film 10B and the hypotenuse face 20a of the second prism member 20 are bonded together with an adhesive, thereby producing a cemented member 50 shaped like a regular quadrangular prism having a square cross section.

FIG. 4 is a perspective view of thus produced cemented member 50 as observed obliquely from thereabove. As mentioned above, the length L10 of the first prism member 10 is made longer than the length L20 of the second prism member 20, whereby, upon bonding, the upper and lower end portions of the first prism member 10 project from the upper and lower ends of the second prism 20 by substantially the same length as protrusions 10d, 10e. These protrusions 10d, 10e are useful in a sixth step which will be explained later.

In this embodiment, since the first prism member 10 is longer than the second prism member 20, the first light reflecting dichroic film 10B is exposed at the protrusions 10d, 10e. In the following, when distinction is necessary in particular, of the first light reflecting dichroic film 10B, the respective parts exposed at the protrusions 10d, 10e will be referred to as exposed portions 10Bd, 10Be.

Preferably employed as the adhesive for bonding the first and second prism members 10, 20 is a UV-curable adhesive. This is because the adhesive can be tentatively cured at first with a little amount of UV-ray irradiation so as to observe the state of adhesion and, after the uniformity of the adhesive layer or the like is confirmed, full-scale irradiation can be effected so as to fully cure the adhesive.

Fourth Step

Figure 5:
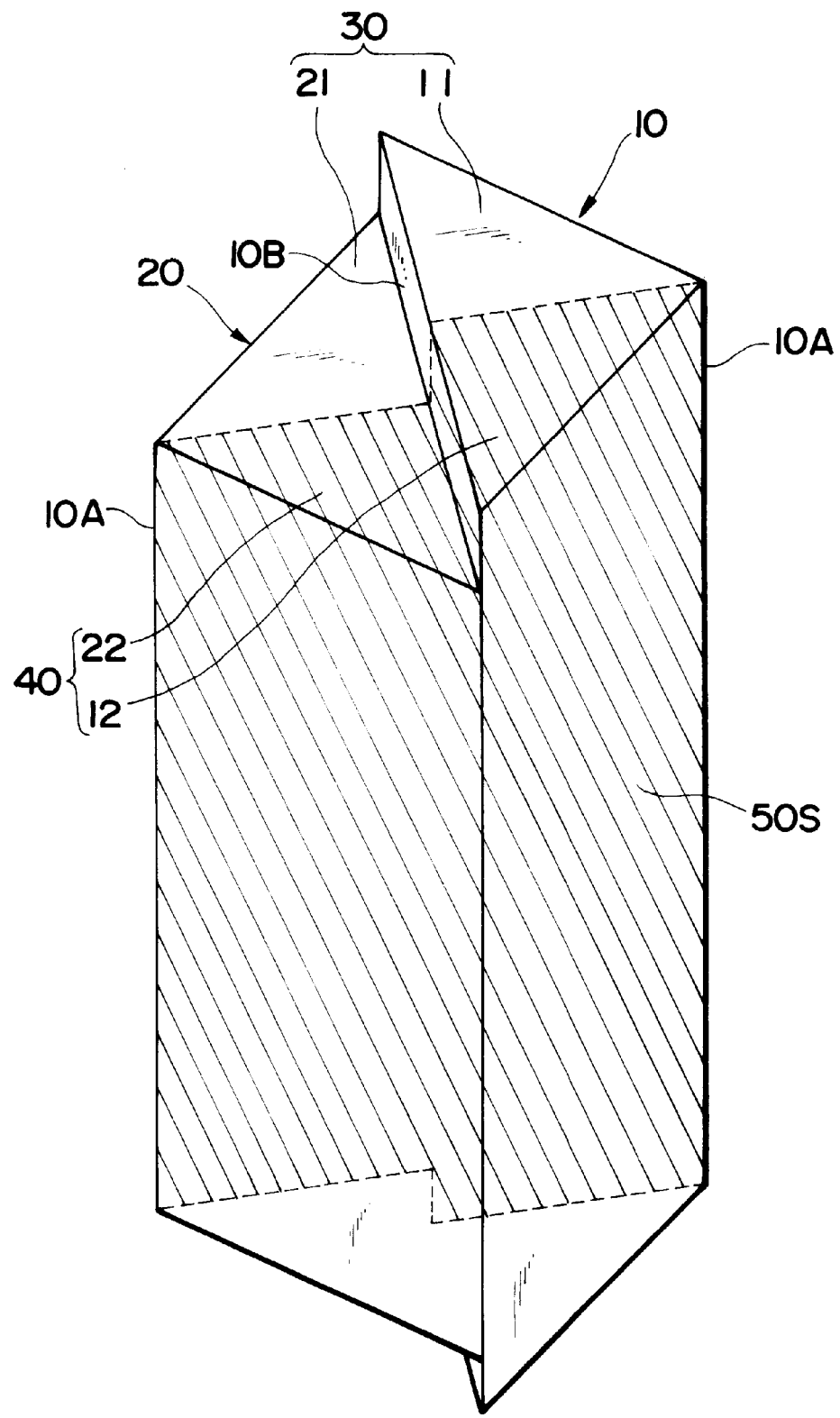
FIG. 5 is a view showing a step subsequent to the step of FIG. 4, indicating a cutting plane for cutting the cemented member.
Figure 6A:
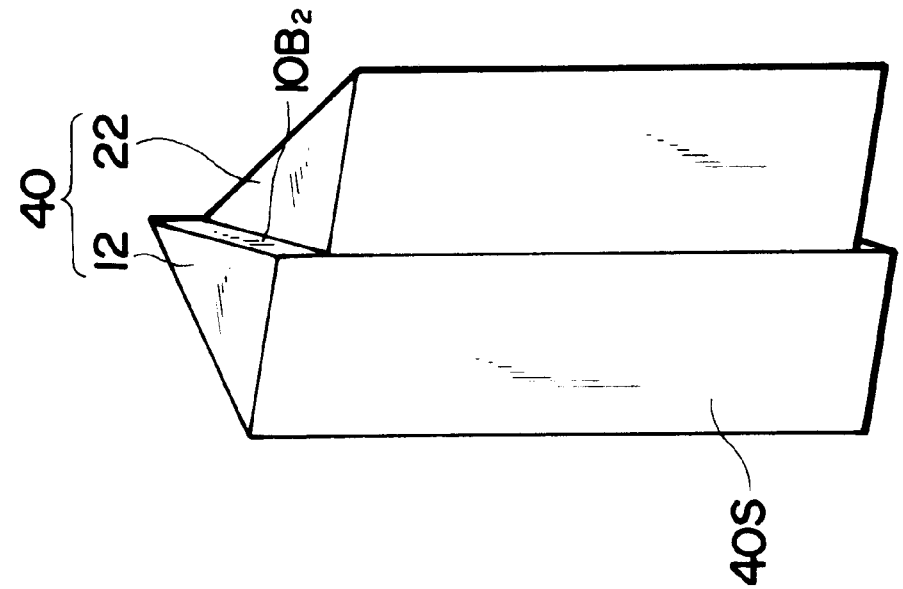
FIGS. 6A and 6B are views showing a step subsequent to that of FIG. 5, which are perspective views respectively showing first and second cemented members formed upon cutting.
Figure 6B:
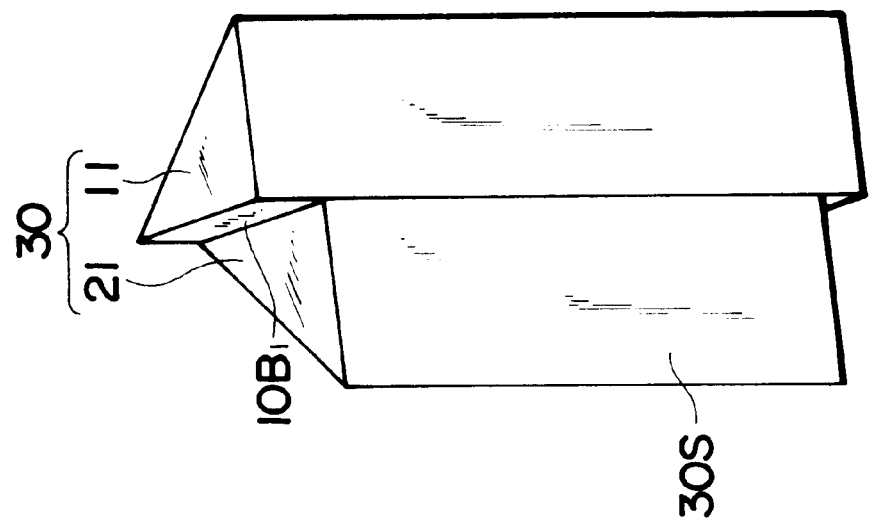

Thus produced cemented member 50 is cut at a plane which is perpendicular to the bonding face between the first prism member 10 and the second member 20 (which plane is the same as a plane perpendicular to the first light reflecting dichroic film 10B). FIG. 5 shows this cutting plane 50S. The cutting plane 50S passes the rectangular portions 10A, 20A of the first and second prism members 10, 20.

Upon this cutting operation, the cemented member 50 is divided into halves, i.e., a first cemented member 30 and a second cemented member 40. As a consequence, the first prism member 10 is divided into two members (hereinafter referred to as "rectangular prisms 11, 12") which are identical in shape. Similarly, the second prism member 20 is divided into two members (hereinafter referred to as "rectangular prisms 21, 22") which are identical in shape. Thus obtained are, as mentioned above, the first cemented member 30 in which the rectangular prisms 11, 21 are bonded together, and the second cemented member 40 in which the rectangular prisms 12, 22 are bonded together.

Here, since the rectangular prisms 11, 12 are produced by cutting and dividing the same first prism member 10 into two members, these rectangular prisms 11, 12 can attain a very small refractive index difference therebetween, which is specifically 0.00005 or less, preferably 0.00001 or less. Similarly, since the rectangular prisms 21, 22 are produced by cutting and dividing the same second prism member 10 into two members, these rectangular prisms 21, 22 can attain a very small refractive index difference therebetween, which is specifically 0.00005 or less, preferably 0.00001 or less.

As the cemented member 50 is divided into the first and second cemented members 30, 40, the first light reflecting dichroic film 10B is divided into halves, i.e., first light reflecting dichroic films $10B_1$, $10B_2$.

Then, the hypotenuse faces 30S, 40S, which are the respective cutting planes of the first and second cemented members 30, 40, are ground and further optically polished. It is necessary for one hypotenuse face 30S to attain an accurate perpendicularity with respect to the bonding face (first light reflecting dichroic film $10B_1$) between the rectangular prisms 11, 21 constituting the first cemented member 30. Similarly, it is necessary for the other hypotenuse face 40S to attain an accurate perpendicularity with respect to the bonding face (first light reflecting dichroic film $10B_2$) between the rectangular prisms 12, 22 constituting the second cemented member 40.

Fifth Step

On one of the hypotenuse faces 30S, 40S of the first and second cemented members 30, 40, a second dichroic film (hereinafter referred to as "second light reflecting dichroic film") 30R having a characteristic of reflecting second light (which is assumed to be R light in this embodiment) is formed by a physical deposition technique such as vacuum deposition. Here, the optical contact (planarity) of the second light reflecting dichroic film 30R is securely ensured by the above-mentioned optical polishing operation and this step.

In this embodiment, the second light reflecting dichroic film 30R is formed on the hypotenuse face 30S of the first cemented member 30 (see FIG. 2).

Sixth Step

The hypotenuse face 30S of the first cemented member 30 formed with the second light reflecting dichroic film 30R, and the hypotenuse face 40S of the second cemented member 40 are bonded together with an adhesive 52, thereby producing the cross dichroic prism 1.

Figure 7:
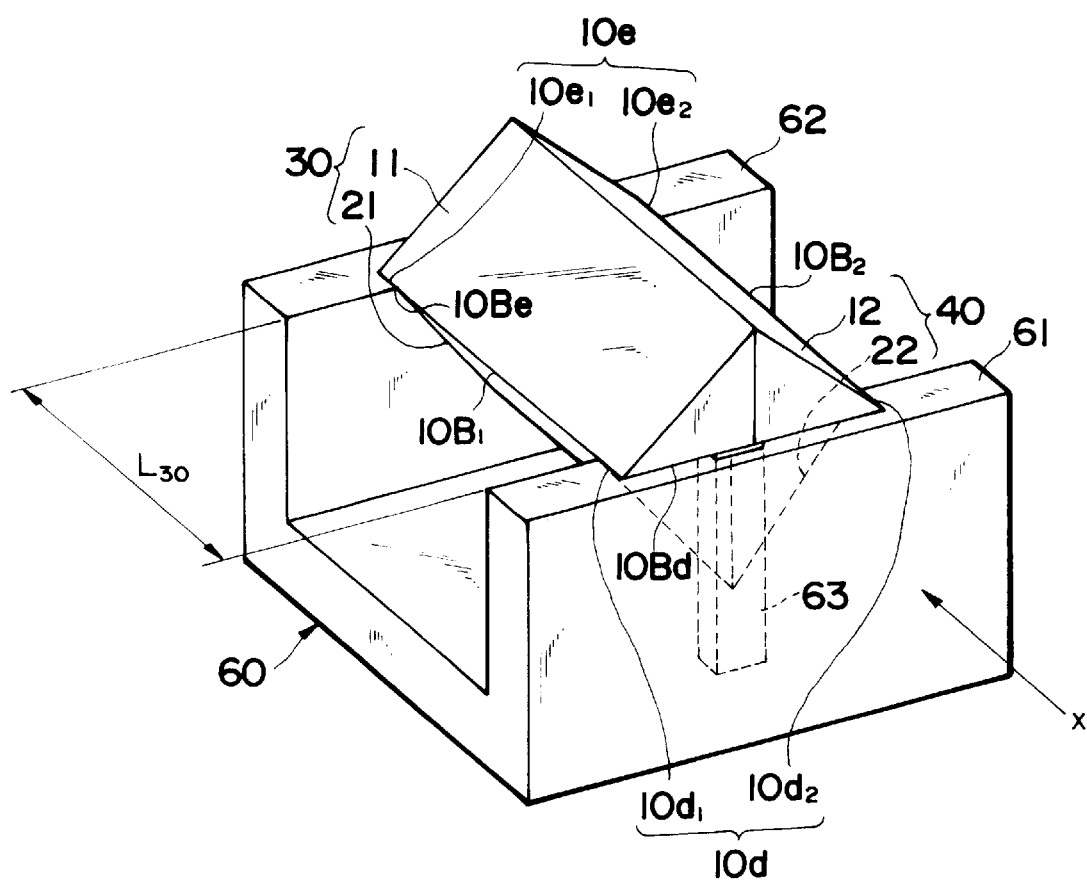
Figure 8:
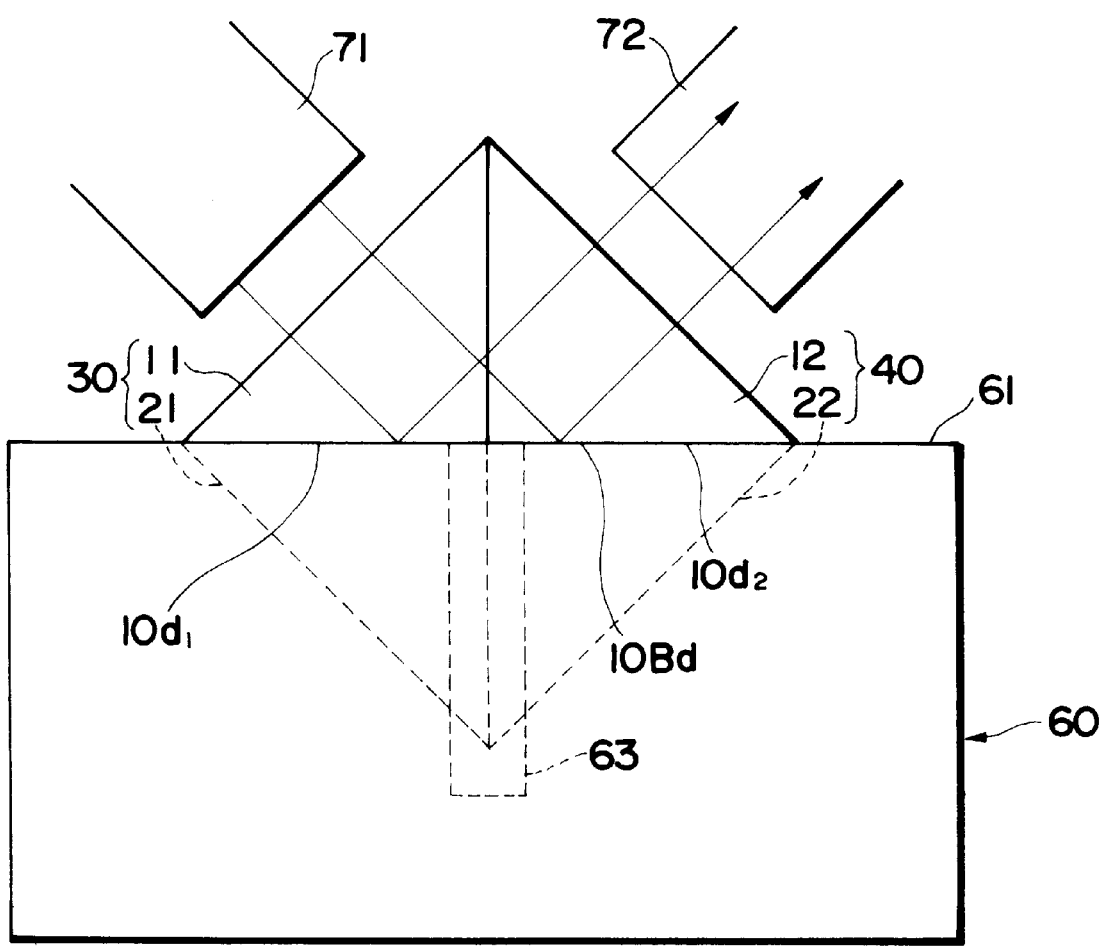

FIGS. 7 and 8 are views showing how the first cemented member 30 and the second cemented member 40 are bonded together by means of a jig 60, in which FIG. 7 is a perspective view thereof, whereas FIG. 8 is a view thereof as observed from the X direction. The jig 60 is formed like a gutter from glass, plastics, ceramics, or metal as its material. On the upper face thereof at two positions separated from each other, reference faces 61, 62 are disposed on the same plane with a predetermined accuracy and further are optically polished so as to be finished into uniform planes, respectively.

The space $L_{30}$ between the reference faces 61, 62 is set longer than the length $L_{20}$ of the second prism member 20 shown in FIG. 4 but shorter than the length $L_{10}$ of the first prism member 10. Of the protrusions 10d, 10e of the first prism member 10 in FIG. 4, when those in the first cemented member 30 are referred to as protrusions $10d_1$, $10e_1$, and those in the second cemented member 40 are referred to as protrusions $10d_2$, $10e_2$, the protrusions $10d_1$, $10e_1$ come into contact with the reference face 61, whereas the protrusions $10d_2$, $10e_2$ come into contact with the reference face 62. Namely, of the first light reflecting dichroic film 10B, the exposed portions 10Bd, 10Be come into contact with the reference faces 61, 62, respectively.

While these contact states are maintained, the first cemented member 30 and the second cemented member 40 are bonded together as shown in FIG. 7. Before this bonding operation, as mentioned above, it is important that the exposed portion 10Bd and the reference face 61 come into optical contact with each other and that the exposed portion 10Be and the reference face 62 come into optical contact with each other. Realizing these contact states can ensure the planarity between the first light reflecting films $10B_1$ and $10B_2$.

Each of the reference faces 61, 62 is formed with a groove 63 shown in FIG. 7 (only the groove 63 in the reference face 61 being depicted in FIG. 7), thereby preventing the adhesive dripping down from the bonding face upon bonding from contaminating the reference faces 61, 62.

The optical contact (planarity) between the reference face 61 and the protrusions $10d_1$, $10d_2$ of the first and second cemented members 30, 40 and the optical contact (planarity) between the reference face 62 and the protrusions $10e_1$, $10e_2$ of the first and second cemented members 30, 40 may be confirmed, for example, by observing Newton's rings generated between the first light reflecting dichroic films $10B_1$, $10B_2$ and the reference faces 61, 62 or, as shown in FIG. 8, by employing autocollimators 71, 72 respectively used for emitting light and receiving the emitted light.

It is preferred that the adhesive be cured while the optical contact (planarity) is confirmed and, when necessary, is adjusted.

As the adhesive, for the same reason as that mentioned above, a UV-curable adhesive is preferably used.

Thereafter, antireflection films may further be formed on the side faces $10b_1$, $10b_2$, $20b_1$, $20b_2$.

In the cross dichroic prism 1 produced by the method of making a cross dichroic prism in accordance with this embodiment, as shown in FIG. 2, of the first light reflecting dichroic film 10B divided into halves, the first light reflecting dichroic film $10B_1$ on the first cemented member 30 and the first light reflecting dichroic film $10B_2$ on the second cemented member 40 can be disposed on the same plane upon re-bonding, and the second light reflecting dichroic film 30R can also be formed flat.

Though the length L10 of the first prism member 10 is set longer than the length L20 of the second prism member 20 here, their relationship is reversible. In the reversed case, the first light reflecting dichroic film 10B is not exposed at the protrusions $10d_1$, $10e_1$, $10d_2$, $10e_2$ of the first and second cemented members 30, 40, whereas the polished face of the second prism member 20 is exposed. Further, upon bonding, this polished face comes into contact with the reference faces 61, 62, whereby, of the light emitted from the autocollimator 71 in FIG. 8, the component transmitted through the adhesive and then reflected by the second light reflecting dichroic film 30R is made incident on the receiving autocollimator 72. Therefore, it is important that the adhesive between the first cemented member 30 and the second cemented member 40 be constant in thickness. When the thickness is not constant, this measurement would not make sense. This is because, while the inclinations of the first light reflecting dichroic films $10B_1$, $10B_2$ of the first and second cemented members 30, 40 can be measured, when they yield differences in level, the amount thereof cannot be measured. The same can also hold true when the optical contact (planarity) is observed through Newton's rings.

Though the hypotenuse face 10a of the first prism member 10 is formed with the B light reflecting dichroic film 10B, and the hypotenuse face 30S of the first cemented member 30 is formed with the R light reflecting dichroic film 30R here, they may be formed in the reverse order as well. Namely, the hypotenuse face 10a of the first prism 10 may be initially formed with an R light reflecting dichroic film, and then the hypotenuse face 30S of the first cemented member 30 may be formed with a B light reflecting dichroic film. As mentioned above, employed is a method in which, after the hypotenuse face 30S of the first cemented member 30 is polished, the hypotenuse face 30S is formed with the second light reflecting film 30R, thereby ensuring its form and planarity. This method can make the planarity of the second light reflecting dichroic film 30R better than the planarity of the first light reflecting dichroic film 10B. In general, when compared with B light, R light has been known to yield a higher spectral luminous efficacy. In view of this feature, it is considered preferable to employ the above-mentioned method in which the first light reflecting dichroic film 10B for reflecting B light is formed first and then the second light reflecting dichroic film 30R for reflecting R light is formed.

In the sixth step, for producing the cross dichroic prism 1, the amounts of projection of the first cemented member 30 and the second cemented member 40 with respect to the reference face 61 are made substantially identical to each other.

Figure 9:
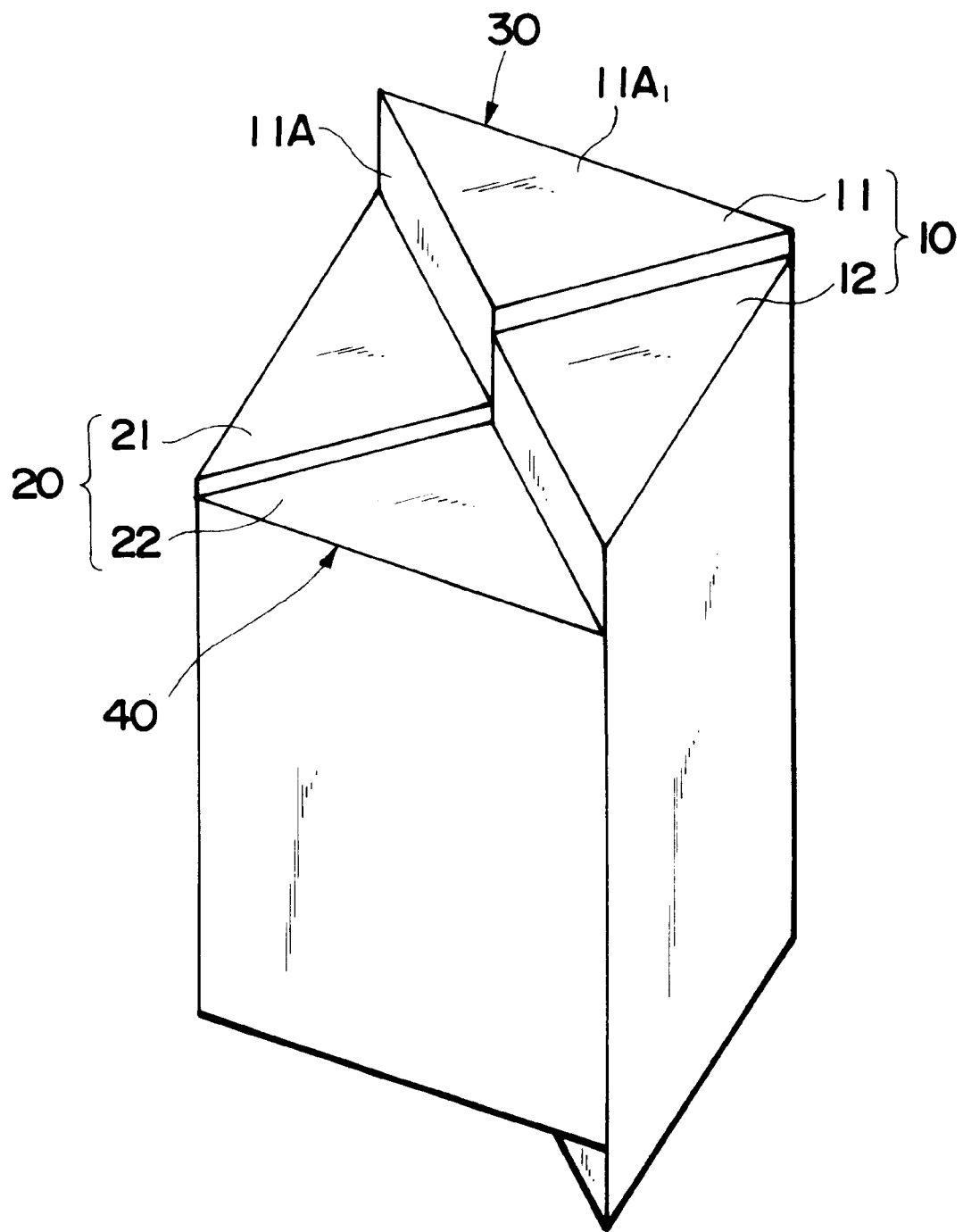
FIG. 9 is a perspective view showing a modified example of the embodiment shown in FIG. 1.

It is not necessary for these amounts of projection to be identical to each other, however. Namely, the amounts of projection of the first cemented member 30 and second cemented member 40 can be made different from each other on both sides of the lengthwise direction. FIG. 9 is a perspective view of thus produced dichroic prism.

Namely, it can be configured to have a portion 11A with the largest amount of projection. In this configuration, when a planarity is secured in the bottom face $11A_1$ of the portion 11A, and the perpendicularity of the bottom face $11A_1$ with respect to the hypotenuse face 10a and side faces $10b_1$, $10b_2$ of the first prism member 10 is attained in the first step, the bottom face $11A_1$ can be used as a reference face after the cross dichroic prism is produced. Namely, the bottom face $11A_1$ can be used as the reference face for finishing the cross dichroic prism into a rectangular parallelepiped or cubic form in the end, or the reference face for attaching it to a projector which will be explained later.

As explained in the foregoing, this method of making the cross dichroic prism 1 comprises the steps of initially preparing the first and second prism members 10, 20; bonding these members; and then cutting thus bonded members. Consequently, every two adjacent rectangular prisms (rectangular prisms 11, 12; and rectangular prisms 21, 22) which have initially been integral but later been divided into halves can have are fractive index difference of 0.00005 or less, preferably 0.00001 or less.

The first light reflecting dichroic film 10B for reflecting B light and the second light reflecting dichroic film 30R for reflecting R light formed within the cross dichroic prism 1 are arranged orthogonal to each other in an X shape. Though being separated from each other across the center part of X, the first light reflecting dichroic films $10B_1$, $10B_2$ can be accurately disposed on the same plane, whereas the undivided second light reflecting dichroic film 30R can secure its planarity, of course. Hence, influences of the first light reflecting film 10B and second light-reflecting dichroic film 30R upon the individual incident color light components can be eliminated.

Figure 10:
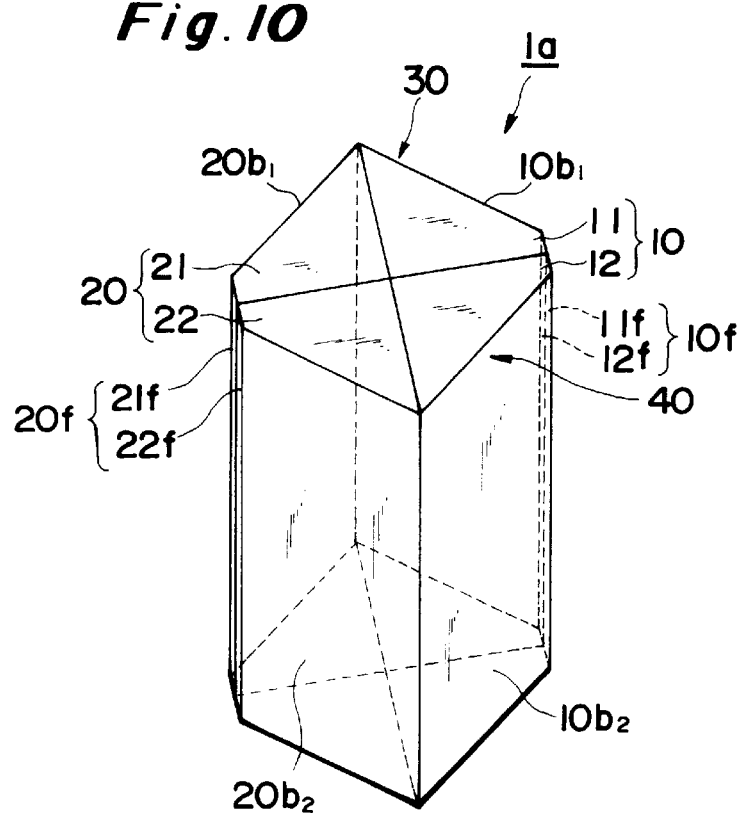
Figure 11:
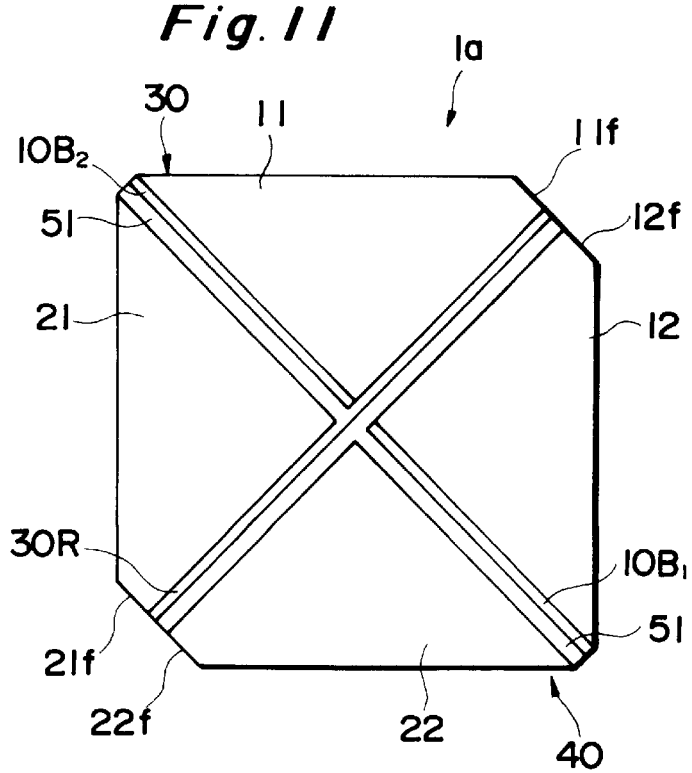
FIG. 11 is a horizontal sectional view thereof.

In the following, a second embodiment of the cross dichroic prism in accordance with the present invention will be explained. FIG. 10 is a perspective view showing a configuration of the cross dichroic prism 1a in accordance with the second embodiment, whereas FIG. 11 is a horizontal sectional view thereof. The basic configuration of this prism 1a is identical to that of the prism 1 in accordance with the first embodiment shown in FIGS. 1 and 2. They differ from each other only in that the four prisms 11, 12, 21, 22 constituting the prism 1a are identical in shape and each have a trapezoidal cross section yielded by cutting off a part of a rectangular triangle, whereby the prism 1a has a hexagonal cross section. In the following, these sectional faces will be referred to as 11f, 12f, 21f, and 22f, respectively.

These sectional faces 11f, 12f, 21f, 22f function as reference faces upon producing the prism 1a, as with the protrusions 10Bd, 10Be shown in FIG. 4 in the first embodiment. It is not preferable to increase the size of these faces so much, since the effective area usable as a combining or decomposing optical system would decrease thereby.

The operation of this embodiment will not be explained here since it is identical to that in the first embodiment. In the following, the manufacturing process in this embodiment will be explained step by step in detail.

First Step

Transparent optical prism members 10, 20 having isosceles right triangular cross sections identical in shape, made of optical glass, are prepared. Here, the members have the same sectional form, and the heights of triangular prisms, i.e., lengths in the longitudinal direction, in both members are substantially identical to each other.

The bottom faces, hypotenuse faces, and side faces of these members are accurately ground beforehand, thereby securing a predetermined shape. Then, in each of the members 10, 20, the hypotenuse face opposing the right angle and both side faces defining the rectangular portion therebetween are optically polished.

Second Step

On the polished hypotenuse face 10a of the member 10 mentioned above, a dichroic film having a first light (B light) reflecting characteristic is formed by a physical deposition technique such as vacuum deposition. No dichroic film is formed on the member 20.

Third Step

The hypotenuse face 10a of the member 10 formed with the first light reflecting dichroic film and the polished hypotenuse face 20a of the member 20 formed with nothing are bonded together with an adhesive 51, thereby producing a cemented member 30.

Figure 12:
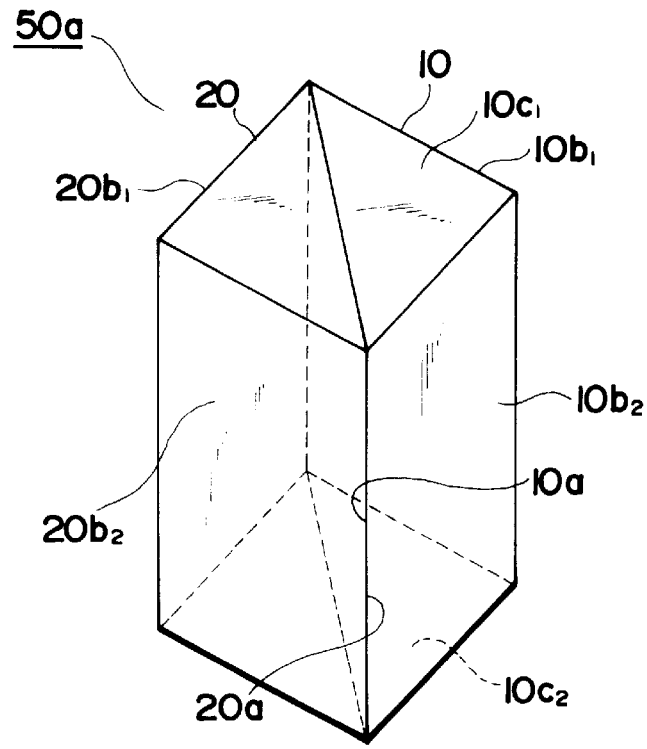
FIG. 12 is a view showing a part of manufacturing steps of the cross dichroic prism in accordance with the second embodiment, as a perspective view showing a cemented member in which two triangular prisms are bonded together.

FIG. 12 shows the cemented member 30.

Figure 13:
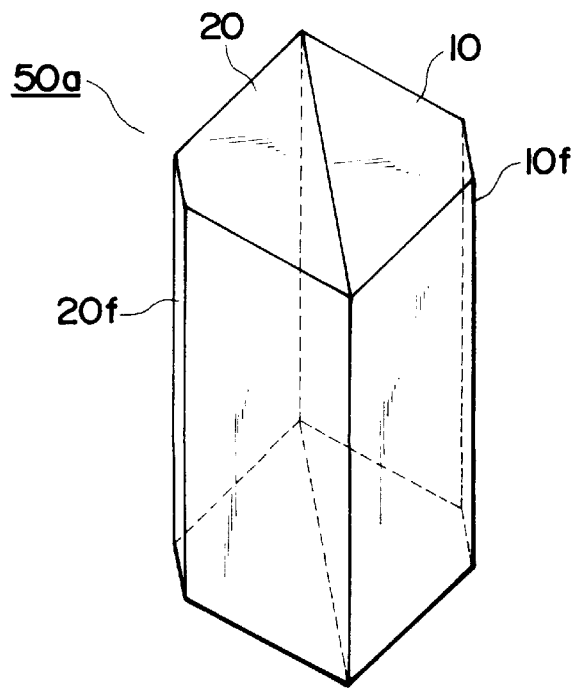
FIG. 13 is a view showing a step subsequent to that of FIG. 12, indicating a cemented member shaped into a hexagonal prism form by shaving off the rectangular edges of triangular prism members.

Then, as shown in FIG. 13, the unbonded rectangular portions of the members 10, 20 constituting the cemented member 30 are cut at planes in parallel to the bonded plane of the members 10, 20 in thus produced cemented member 30, thereby forming cut faces 10f, 20f. Since the cut faces 10f, 20f become reference faces in a later step, it is preferred that each of them be polished so as to improve the planarity. Though the cut faces are planes in parallel to the bonding face in this embodiment, they are not always restricted to planes in parallel to the bonding face as long as their planarity is good.

Fourth Step

Figure 14:
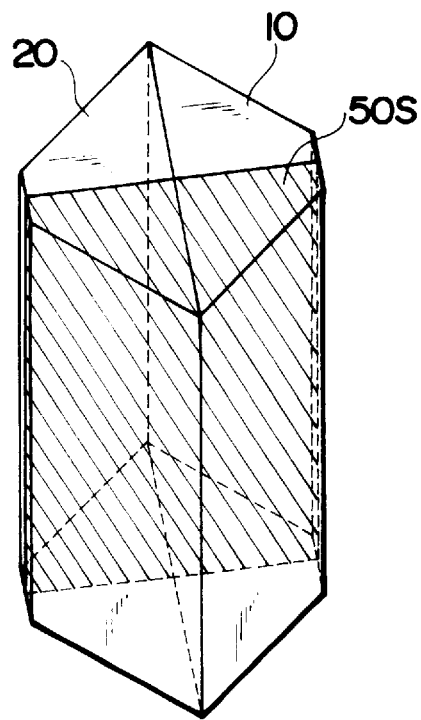
FIG. 14 is a view showing a step subsequent to the step of FIG. 13, indicating a cutting plane for cutting the cemented member.

As shown in FIG. 14, the cemented member 30 is cut at a plane 50S perpendicular to the bonding face between the members 10, 20 in the cemented member 30 produced in the previous step.

Figure 15A:
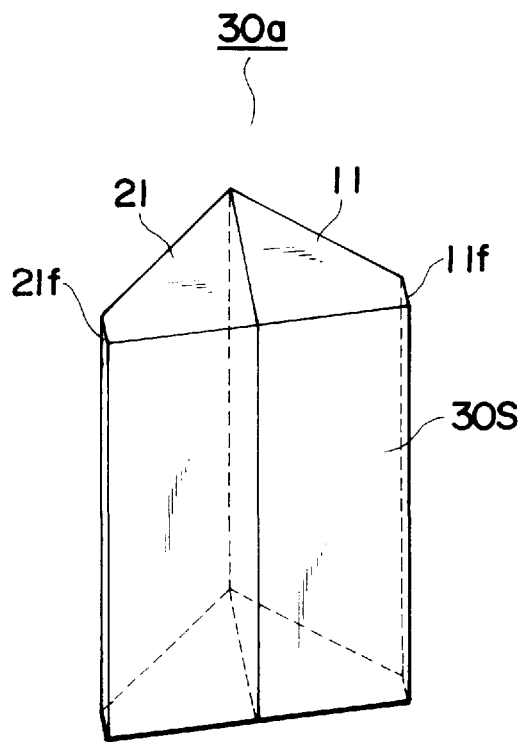
FIGS. 15A and 15B are views showing a step subsequent to that of FIG. 14, which are perspective views respectively showing first and second cemented members formed upon cutting.
Figure 15B:
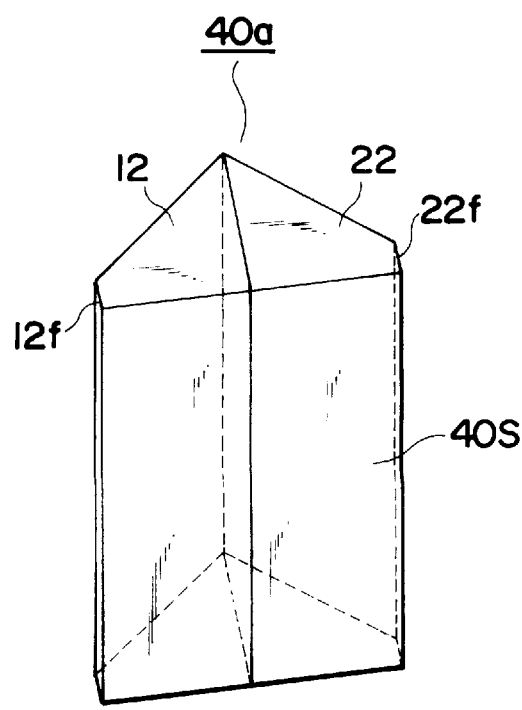

FIGS. 15A and 15B show perspective views of a first cemented member 30a and a second cemented member 40a which are produced upon cutting. The first cemented member 30a is constituted by the members 11, 21 cemented together, whereas the second cemented member 40a is constituted by the members 12, 22 cemented together.

The cutting planes 30S, 40S of thus produced first and second cemented members 30a, 40a are ground and optically polished. It is necessary for thus polished planes to attain an accurate perpendicularity with respect to the bonding face between the members 11, 21 constituting the first cemented member 30a and the bonding face between the members 12, 22 constituting the second cemented member 40a.

Fifth Step

On one of the polished base faces 30S or 40S of the first cemented member 30a or second cemented member 40a, a second light (R light) reflecting dichroic film 30R is formed by a physical deposition technique such as vacuum deposition. The planarity of the second light reflecting dichroic film 30R is securely ensured by the previous step and this step.

Sixth Step

The base face formed with the second light reflecting dichroic film 30R and the polished face (30S, 40S) of the first and second cemented members 30a, 40a are bonded together with an adhesive, thereby producing a dichroic prism.

Figure 17:
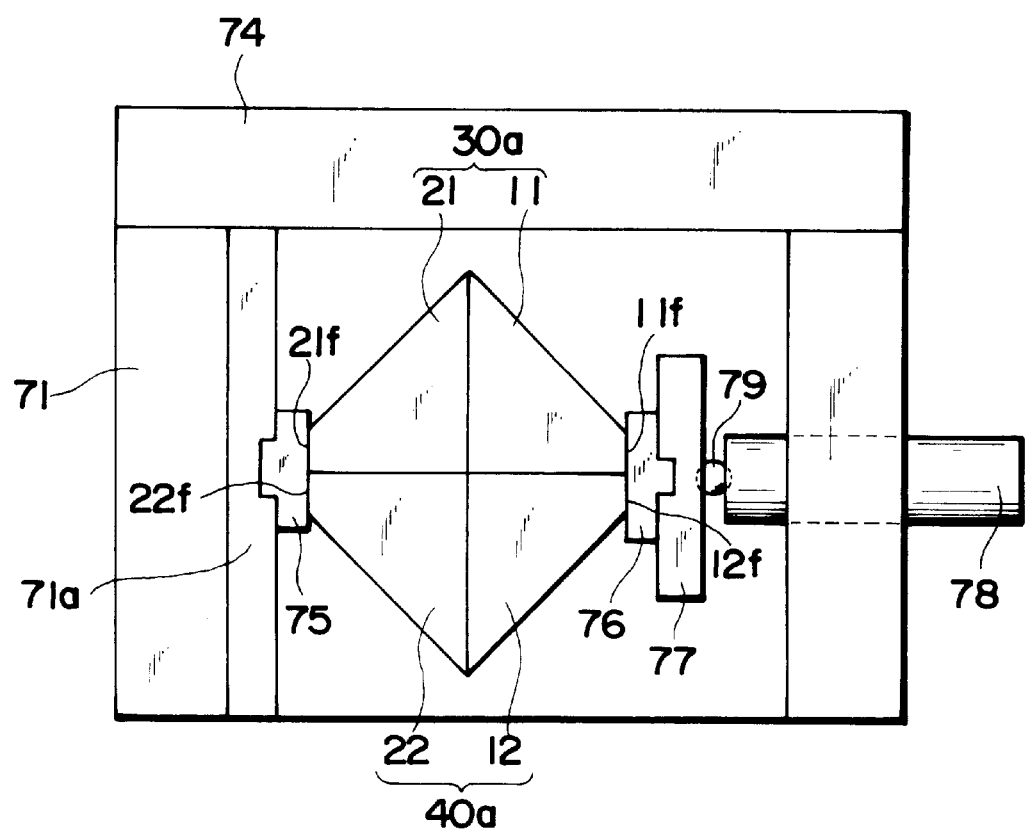

FIG. 16 is a perspective view showing how this bonding operation is carried out, whereas FIG. 17 is a plan view thereof.

A bonding jig 70, which is made of a metal such as stainless, is basically constituted by members 71, 72, and 73, so as to yield a recessed cross section. The member 71 has a protrusion 71a therein. Further, a member 74 is firmly secured to one side face of the member 71 with a screw or the like.

A groove is accurately formed in the inner side face of the protrusion 71a along the heightwise direction. Precisely fitted into the groove without chatter is a projection of a first pressing member 75.

Formed on the opposite side of the projection of the member 75 is a highly accurate plane, with which one side of the cut faces (21f, 22f in the drawings) of the first and second cemented members 30a, 40a constituting the dichroic prism to be cemented together can come into surface contact.

An axial member 78 penetrates through the member 72 opposing the member 71. A tip portion of the axial member 71 is configured such as to push an auxiliary pressing member 77 by way of a ball member 79. Further, the face of the auxiliary pressing member 77 opposite to the pressing face of the ball member 79 is formed with a groove extending in the heightwise direction. As a projection of a second pressing member 76 is fitted into the groove, the face accurately securing a planarity opposite to the projection of this member can push the other side of the cut faces (11f, 12f in the drawings) of the first and second cemented member 30a, 40a to be cemented together.

As shown in FIGS. 16 and 17, the first cemented member 30a and the second cemented member 40a are bonded together with an adhesive held therebetween. When a bonding step is performed according to this method, namely, the faces 11f, 12f, 21f, 22f are used as reference faces upon bonding, the cut prism faces conform to these reference faces, whereby a planarity would be secured. Hence, each of the first light reflecting dichroic films $10B_1$, $10B_2$ of the first and second cemented members 30a, 40a can secure a planarity.

Further, since the first and second cemented members 30a, 40a are perpendicularly cut while using these cut faces as reference faces, and then are ground and polished, a planarity is secured when forming the second light reflecting dichroic film 30R. As a result, a planarity is secured in both of the first and second light reflecting dichroic films 10B, 30R in thus bonded cross dichroic prism, which can be considered an ideal cross dichroic prism.

Though not shown in FIGS. 16 and 17, each of the parts of the members 75, 76, and 73 coming into contact with the bonding portions of the members to be bonded together is formed with a groove so as to prevent the adhesive dripping down upon the bonding operation from contaminating the contact faces of these members, such that the adhesive drops into the groove. Also, though the members to be bonded have reference faces 11f, 12f, 21f, 22f on both sides in these steps, whereby these faces are pushed from both sides, one side of the reference faces 11f and 12f or 21f and 22f may be provided alone. In this case, unlike the configuration of the members 76, 77 in FIG. 16, the first cemented member 30a and the second cemented member 40a are supported by their side faces, so as to push their prism reference faces.

As explained in the foregoing, in the method of making a cross dichroic prism in accordance with this embodiment, two prism members are initially prepared, and the steps of bonding these prisms together and then cutting them are employed, whereby two members formed into two prisms from the same initial prism can yield substantially the same refractive index. Hence, performances of the cross dichroic prism can be restrained from deteriorating due to fluctuations in refractive indexes between prisms used therein.

The method of making a cross dichroic prism in accordance with the present invention should not be restricted to the cross dichroic prism having substantially a square cross section as with the above-mentioned embodiments but is applicable to prisms having other cross-sectional forms such as rhombus and parallelogram, of course, whereby dichroic films can be disposed on the same plane.

Figure 18:
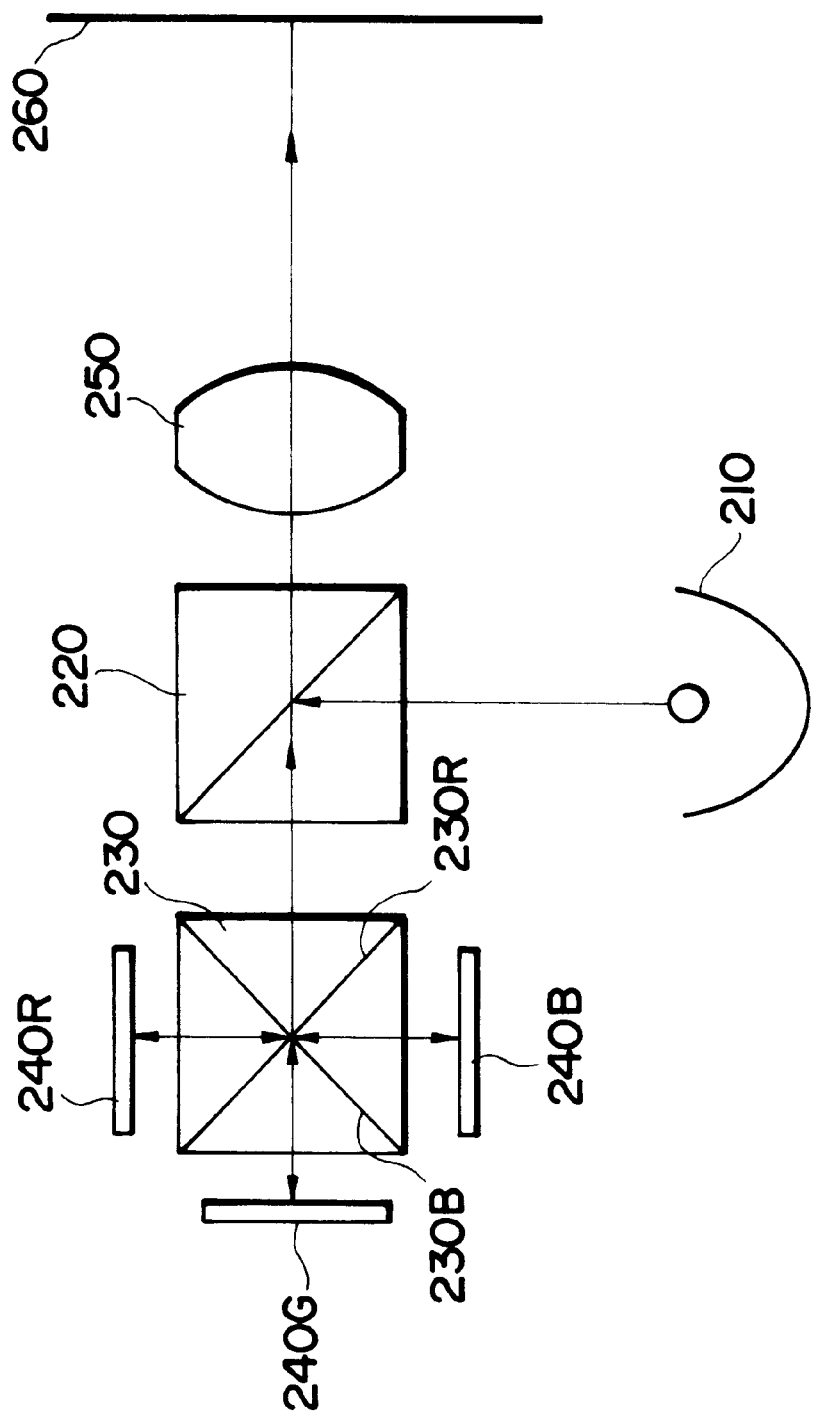
FIGS. 18 and 19 are views showing first and second embodiments of the projector in accordance with the present invention, respectively.

FIG. 18 is a schematic configurational view showing a first embodiment of a projector using a cross dichroic prism of the present invention for decomposing and combining three colors.

White source light emitted from a light source 210 is made incident on a polarizing beam splitter 220, and is split in terms of polarization by a polarization splitting portion of the polarizing beam splitter 220, and the polarized light (S-polarized light) emitted therefrom as being reflected thereby is made incident on a cross dichroic prism 230 in accordance with the above-mentioned first or second embodiment thereof.

Of the incident light, a red light component is reflected by a red light reflecting dichroic film 230R in the cross dichroic prism 230 so as to be made incident on a reflection type liquid crystal light valve 240R as readout light. A blue light reflecting dichroic film 230B reflects only a blue light component, which is then made incident on a blue light liquid crystal light valve 240B as readout light.

A green light component passing through the red and blue light reflecting dichroic films of the cross dichroic prism 230 advances as it is so as to pass through the cross dichroic prism 230, thereby becoming incident on a green light liquid crystal light valve 240G.

The individual color light components incident on the reflection type liquid crystal light valves for the respective color light components are modulated by their corresponding writing light signals or electric signals (neither of which are depicted) so as to be reflected and emitted, thereby becoming incident on the cross dichroic prism 230 along the same optical paths as their incident light beams.

Subsequently, the three color light components are combined by the dichroic films 230R, 230B in the dichroic prism 230, and then the resulting composite light is made incident on the polarizing beam splitter 230, where only the modulated light component is analyzed so as to be transmitted through and emitted out of the polarizing beam splitter 230, thereby being projected through a projection lens 250 onto a screen 260.

This projector can project vivid images since the optical axis deviation is small in the cross dichroic prism and, consequently, pixel deviations would not occur color by color. It is suitable, in particular, for projecting high-resolution images having a large number of pixels, and wide pictures.

Figure 19:
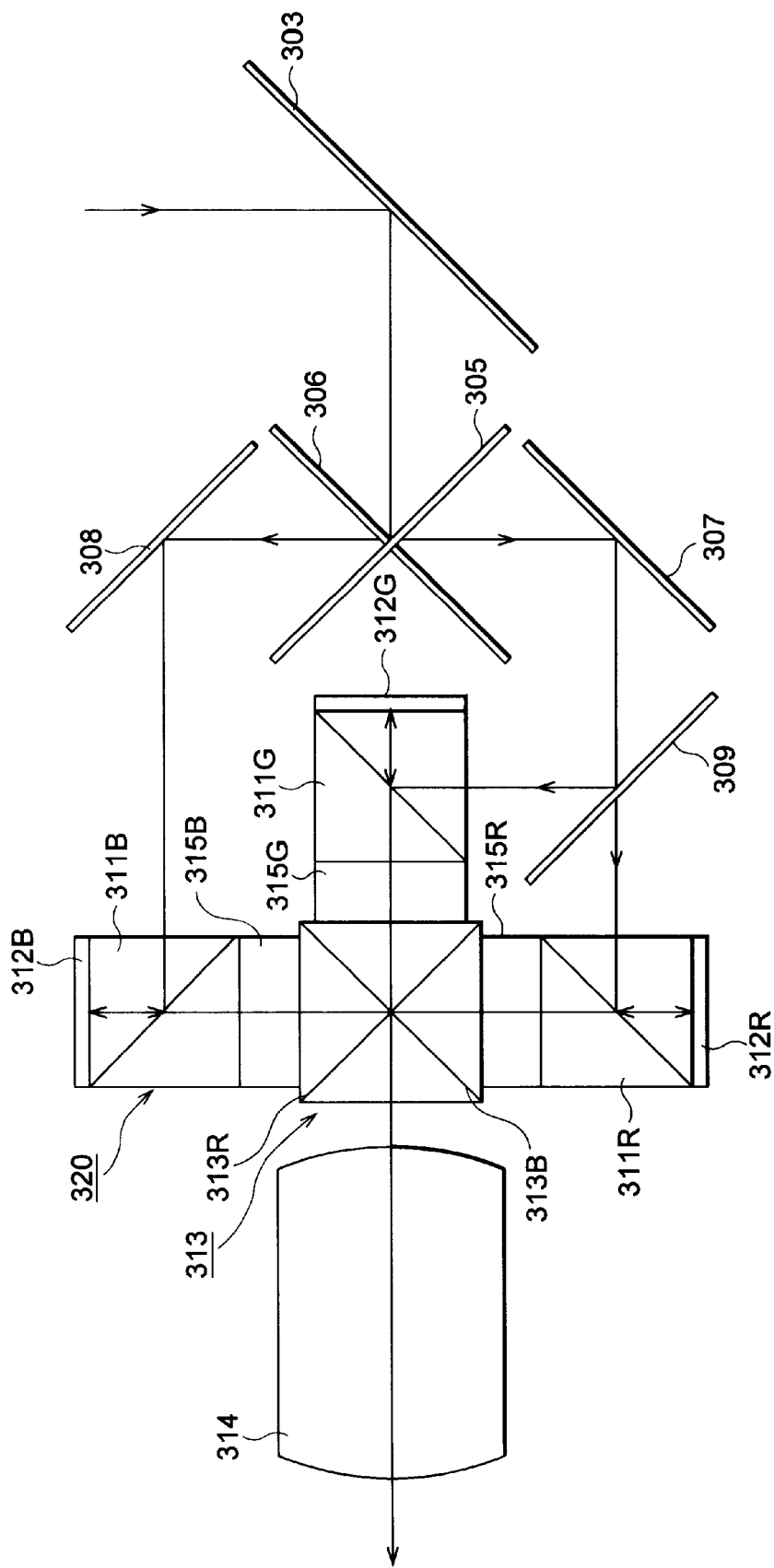

FIG. 19 is a schematic configurational view showing a second embodiment of a projector using a cross dichroic prism of the present invention for combining three colors.

This projector is mainly composed of a trichromatic separation optical system for separating the source light into beams of the three primary colors R, G, and B and an analyzing-synthesizing optical system for producing projected images of the respective colors and synthesizing them. Among them, the trichromatic separation optical system is composed of three mirrors 303, 307 and 308, and dichroic mirrors 305, 306 and 309 which reflect B light, RG mixed light or G light respectively.

The analyzing-synthesizing optical system is constructed by integrating light valves 312R, 312G and 312B for the respective color beams, polarization beam splitters (PBSs) 311R, 311G and 311B, a cross dichroic prism 313 for synthesis in accordance with above-mentioned first or second embodiment thereof, and path length correcting members 315R, 315G and 315B.

This projector also projects vivid images as well as the first embodiment projector.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A cross dichroic prism comprising:

four triangular prisms having isosceles right triangular cross sections identical in shape, opposing side faces thereof being bonded and secured together with rectangular portions thereof facing each other; and a dichroic film having an x-shaped cross section formed between the bonding faces of said triangular prisms, wherein, of said four triangular prisms, a given prism and at least one of the prisms adjacent thereto have a refractive index difference therebetween of 0.00001 to 0.00005, and the remaining two prisms opposed thereto have a refractive index difference therebetween of 0.00001 to 0.00005.

2. A three-sheet type full-color projector comprising a cross dichroic prism having light valves respectively used for three colors of red, blue, and green, and a dichroic film having an X-shaped cross section, a center of said dichroic film being disposed at an intersection of output optical axes of the respective light valves;

wherein said cross dichroic prism is the cross dichroic prism according to claim 1.

3. A cross dichroic prism comprising four triangular prisms having isosceles right triangular cross sections identical in shape, opposing side faces thereof being bonded and secured together with rectangular portions thereof facing each other; and a dichroic film having an X-shaped cross section formed between the bonding faces of said triangular prisms;

wherein, of said four triangular prisms, a given prism and at least one of the prisms adjacent thereto are formed by processing a single prism member, and the remaining two prisms opposed thereto are formed by processing the same or another single prism member.

4. A three-sheet type full-color projector comprising a cross dichroic prism having light valves respectively used for three colors of red, blue, and green, and a dichroic film having an X-shaped cross section, a center of said dichroic film being disposed at an intersection of output optical axes of the respective light valves;

wherein said cross dichroic prism is the cross dichroic prism according to claim 3.

* * * * *

UNITED STATES PATENT AND TRADEMARK OFFICE
CERTIFICATE OF CORRECTION

PATENT NO. : 6,101,041
DATED : August 8, 2000
INVENTOR(S) : Kazufumi Ishibashi, et al.

Page 1 of 1

It is certified that error appears in the above-identified patent and that said Letters Patent is hereby corrected as shown below:

Title page,
Item [30] Foreign Application Priority Data delete [May 13, 1997 [JP] Japan 9-12665] and [May 13, 1997 [JP] Japan 9-12666].

Signed and Sealed this

Ninth Day of October, 2001

Attest:

*Nicholas P. Godici*

*Attesting Officer*

NICHOLAS P. GODICI
*Acting Director of the United States Patent and Trademark Office*